US011053028B2

(12) United States Patent
Reedy et al.

(10) Patent No.: US 11,053,028 B2
(45) Date of Patent: *Jul. 6, 2021

(54) SATELLITE SYSTEM

(71) Applicant: Skeyeon, Inc., San Diego, CA (US)

(72) Inventors: Ronald E. Reedy, San Diego, CA (US); Thomas E. Schwartzentruber, San Diego, CA (US)

(73) Assignee: Skeyeon, Inc., San Diego, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 16/508,560

(22) Filed: Jul. 11, 2019

(65) Prior Publication Data
US 2019/0344910 A1    Nov. 14, 2019

Related U.S. Application Data

(63) Continuation of application No. 15/439,533, filed on Feb. 22, 2017, now Pat. No. 10,351,267.
(Continued)

(51) Int. Cl.
*B64G 1/40* (2006.01)
*B64G 1/10* (2006.01)
(Continued)

(52) U.S. Cl.
CPC ........... *B64G 1/405* (2013.01); *B64G 1/1085* (2013.01); *B64G 1/242* (2013.01); *F03H 1/0012* (2013.01)

(58) Field of Classification Search
CPC ...... B64G 1/405; B64G 1/1085; F03H 1/0012
See application file for complete search history.

(56) References Cited

U.S. PATENT DOCUMENTS 4,754,601 A    7/1988 Minovitch
5,433,726 A    7/1995 Horstein et al.
(Continued)

FOREIGN PATENT DOCUMENTS

EP    0668212    8/1995
EP    2853737    4/2015
(Continued)

OTHER PUBLICATIONS

Patent Cooperation Treaty, Notification of Transmittal of the International Search Report and the Written Opinion of the International Searching Authority, or the Declaration, Application No. PCT/US2019/013153, dated May 13, 2019, 17 pages.
(Continued)

*Primary Examiner* — Philip J Bonzell
(74) *Attorney, Agent, or Firm* — McAndrews, Held & Malloy, Ltd.

(57) ABSTRACT

A satellite system operates at altitudes between 100 and 350 km relying on vehicles including a self-sustaining ion engine to counteract atmospheric drag to maintain near-constant orbit dynamics. The system operates at altitudes that are substantially lower than traditional satellites, reducing size, weight and cost of the vehicles and their constituent subsystems such as optical imagers, radars, and radio links. The system can include a large number of lower cost, mass, and altitude vehicles, enabling revisit times substantially shorter than previous satellite systems. The vehicles spend their orbit at low altitude, high atmospheric density conditions that have heretofore been virtually impossible to consider for stable orbits. Short revisit times at low altitudes enable near-real time imaging at high resolution and low cost. At such altitudes, the system has no impact on space junk issues of traditional LEO orbits, and is self-cleaning in that space junk or disabled craft will de-orbit.

20 Claims, 9 Drawing Sheets

Related U.S. Application Data (60) Provisional application No. 62/430,727, filed on Dec. 6, 2016.

(51) Int. Cl.
  *B64G 1/24* (2006.01)
  *F03H 1/00* (2006.01)

(56) References Cited

U.S. PATENT DOCUMENTS

| | | |
|---|---|---|
| 6,064,858 A | 5/2000 | Maatman et al. |
| 6,145,298 A | 11/2000 | Burton, Jr. |
| 6,834,492 B2 | 12/2004 | Hruby et al. |
| 6,850,497 B1 | 2/2005 | Sigler |
| 7,270,300 B2 | 9/2007 | Dressler |
| 7,306,189 B2 | 12/2007 | Dressler |
| 7,581,380 B2 | 9/2009 | Wahl |
| 8,312,704 B2 | 11/2012 | Keady |
| 8,723,422 B2 | 5/2014 | Diamant et al. |
| 8,800,932 B2 | 8/2014 | Liu et al. |
| 9,657,725 B2 | 5/2017 | Berl |
| 9,723,386 B1 | 8/2017 | Ni et al. |
| 9,796,487 B2 | 10/2017 | Yi et al. |
| 2002/0041328 A1 | 4/2002 | Lecompte et al. |
| 2003/0046921 A1 | 3/2003 | Hruby et al. |
| 2004/0245407 A1 | 12/2004 | D'Ausilio et al. |
| 2005/0060092 A1 | 3/2005 | Hablani |
| 2005/0178919 A1 | 8/2005 | Dressler |
| 2006/0030311 A1 | 2/2006 | Cruz et al. |
| 2008/0237399 A1 | 10/2008 | Caplin et al. |
| 2009/0251773 A1 | 10/2009 | Danziger et al. |
| 2010/0045512 A1 | 2/2010 | Nelson |
| 2010/0155524 A1 | 6/2010 | Maganas |
| 2011/0192284 A1 | 8/2011 | Sawyer et al. |
| 2012/0062100 A1 | 3/2012 | Liu et al. |
| 2012/0193015 A1 | 8/2012 | Segal et al. |
| 2012/0217348 A1 | 8/2012 | Martinez |
| 2012/0307720 A1 | 12/2012 | Madsen et al. |
| 2013/0102240 A1 | 4/2013 | Helfers |
| 2015/0131703 A1 | 5/2015 | Balter |
| 2015/0228471 A1 | 8/2015 | Shimoi et al. |
| 2016/0094288 A1 | 3/2016 | Krebs |
| 2017/0070939 A1 | 3/2017 | Chong et al. |
| 2017/0192095 A1 | 7/2017 | Jobanputra et al. |

FOREIGN PATENT DOCUMENTS

| | | |
|---|---|---|
| GB | 1181158 | 2/1970 |
| WO | 2017127844 | 7/2017 |

OTHER PUBLICATIONS

Patent Cooperation Treaty, Notification of Transmittal of the International Search Report and the Written Opinion of the International Searching Authority, or the Declaration, Application No. PCT/US2019/013149, dated Jan. 11, 2019, 21 pages.

Patent Cooperation Treaty, Notification of Transmittal of the International Search Report and the Written Opinion of the International Searching Authority, or the Declaration, Application No. PCT/US2017/064712, dated Jul. 23, 2018 (17 pages).

Aerospace America, published monthly by the American Institute of Aeronautics and Astronautics, Inc., Jan. 2015, vol. 53, No. 1, 68 pages.

Gravity Field and Steady-State Ocean Circulation Explorer; Wikipedia, the free encyclopedia; Retrieved from "http://en.wikipedia.org/w/index.php?title=Gravity_Field_and_Steady-State_Ocean_Circulation_Explorer&oldid=660976463"; Last updated May 5, 2015, 7 pages.

Natalia Mironova, African Farmers to Get NASA, NOAA Data on Their Phones (p. 6); Marc Selinger, A Stitch in Time for NASA Airplane Techies (p. 7); Marc Selinger, Satellite Pushed by Former VP Gore Ready for Launch (p. 8); Mark Williamson, Atomospheric Skimming Satellites (p. 9); Aerospace America; Jan. 2015, pp. 6-9; 4 pages.

Lake A. Singh; Very Low Earth Orbit Propellant Collection Feasibility Assessment; A Dissertation Presented to the Academic Faculty; Georgia Institute of Technology; Dec. 2014; 225 pages.

D. Di Cara, J. Gonzalez Del Amo, A. Santovicenzo, B. Carnicero Dominguez, M. Arcioni and A. Caldwell, I. Roma; RAM Electric Propulsion for Low Earth Orbit Operation: an ESA Study; IEPC-2007-162; Presented at the 30th International Electric Propulsion Conference, Florence, Italy; Sep. 17-20, 2007; 8 pages.

Tony Schonherr, Kimiya Komurasaki, Francesco Romano, Bartomeu Massuti-Ballester, and Georg Herdich; Analysis of Atmosphere-Breathing Electric Propulsion; IEEE Transactions on Plasma Science, vol. 43, No. 1, Jan. 2015, 8 pages.

D. Di Cara, J. Gonzalez del Amo, A. Santovincenzo, B. Carnicero Dominguez, M. Archioni, and A. Caldwell, and I. Roma; RAM Electric Propulsion for Low Earth Orbit Operation: an ESA Study; IEPC-2007-162; Presented at the 30th International Electric Propulsion Conference, Florence, Italy; Sep. 17-20, 2007; 8 pages.

G. Cifali, T. Misuri, P. Rossetti, M. Andrenucci, D. Valentian, and D. Feili; Preliminary characterization test of HET and RIT with Nitrogen and Oxygen; 47th AIAA/ASME/SAE/ASEE Joint Propulsion Conference & Exhibit; Jul. 31-Aug. 3, 2011, San Diego, California; AIAA 2011-6073; 16 pages.

Kazutaka Nishiyama; Air Breathing Ion engine Concept; 54th International Astronautical Congress of the International Astronautical Federation, the International Academy of Astronautics, and the International Institute of Space Law; Sep. 29-Oct. 3, 2003, Bremen, Germany; IAC-03-S.4.02; 8 pages.

Kazutaka Nishiyama, Hitoshi Kuninaka, Yukio Shimizu, Kyoichiro Toki; 30mN-Class Microwave Discharge Ion Thruster, Institute of Space and Astronautical Science, IEPC 2003-62, 10 pages.

H.W. Loeb, G.A. Popov, V.A. Obukhov, D. Feili, CH. Collingwood, and A. Mogulkin; Large Radio Frequency Ion Engines, Электронный журнал «Труды МАИ». Выпуск № 60 60—Russian translation: "Electronic journal "Proceedings of the MAI" Issue No. 60" 8 pages.

Kevin D. Diamant; A 2-Stage Cylindrical Hall Thruster for Air Breathing Electric Propulsion; 46th AIAA/ASME/SAE/ASEE Joint Propulsion Conference & Exhibit; Jul. 25-28, 2010, Nashville, TN; AIAA 2010-6522; 9 pages.

Kevin D. Diamant; Microwave Cathode for Air Breathing Electric Propulsion; Presented at the 31st International Electric Propulsion Conference, University of Michigan, Ann Arbor, Michigan, USA; Sep. 20-24, 2009; IEPC-2009-015; 11 pages.

Kazuhisa Fujita; Air Intake Performance of Air Breathing Ion Engines; vol. 52, No. 610, pp. 514-521, 2004; 8 pages.

Leonid Pekker and Michael Keidar; Analysis of Airbreathing Hall-Effect Thrusters; Journal of Propulsion and Power; vol. 28, No. 6, Nov.-Dec. 2012; 7 pages.

Thomas John McGuire; Aero-Assisted Orbital Transfer Vehicles Utilizing Atmosphere Ingestion; Thesis submitted to the Department of Aeronautics and Astronautics; Jun. 8, 2001, 133 pages.

L. Garrigues; Computational Study of Hall-Effect Thruster with Ambient Atmospheric Gas as Propellant; Journal of Propulsion and Power; vol. 28, No. 2, Mar.-Apr. 2012; 11 pages.

Angelo Cervone, Barry Zandbergen, Jian Guo, Eberhard Gill, Wolter Wieling, Flavia Tata Nardini, and Coen Schuurbiers; Application of an Advanced Micro-Propulsion System to the Deli Formation-flying Demonstration Within the QB50 Mission; 63rd International Astronautical Congress, Naples, Italy. Copyright © 2012 by the International Astronautical Federation; IAC-12-C4.6.2; 8 pages.

SATELLITE SYSTEM

CROSS REFERENCE TO RELATED APPLICATIONS

This application claims priority to U.S. Non-Provisional patent application Ser. No. 15/439,533, filed Feb. 22, 2017, entitled "A Satellite System," and to U.S. Provisional Patent Application Ser. No. 62/430,727, filed Dec. 6, 2016, entitled "A Satellite System". The entirety of both of U.S. Non-Provisional patent application Ser. No. 15/439,533 and U.S. Provisional Patent Application Ser. No. 62/430,727 is incorporated herein by reference.

BACKGROUND

Figure 11:
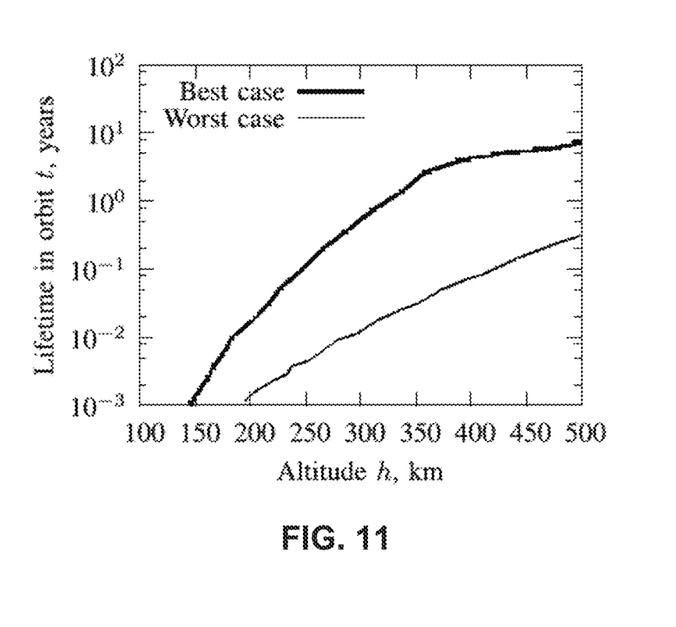
FIG. 11 illustrates graphical data of traditional satellite operational capabilities.

Satellites are used in many aspects of modern life, including earth observation and reconnaissance, telecommunications, navigation (e.g., global positions systems, or "GPS"), environmental measurements and monitoring and many other functions. A key advantage of satellites is that they remain in orbit due to their high velocity that creates an outward centripetal force equal to gravity's inward force. Therefore, once in orbit, they stay there typically for years or decades. See, for example, FIG. 11, which graphically illustrates a best and worst case curve for expected lifetime of orbiting vehicles as a function of altitude. Since the velocities are so high (e.g., 3-8 km/s, depending on altitude), atmospheric drag should be minimized and/or avoided, which means they typically operate outside virtually any trace of the particles that constitute the atmosphere. In addition to drag, atmospheric collisions with particles, even at trace concentrations, can overheat, damage or eventually destroy the satellite.

Satellites are therefore clearly differentiated from atmospheric flying (i.e., airborne) vehicles such as airplanes, unmanned aerial vehicles (UAVs), helicopters or balloons in which the atmosphere supports lift and the vehicles operate at velocities typically between zero (i.e., hovering) to 1-3 times the speed of sound and at altitudes below about 35 km.

Satellite orbital heights are typically categorized in three broad segments: low earth orbit (LEO), medium earth orbit (MEO) and geostationary earth orbit (GEO). The general uses and characteristics of these orbits are shown in Table 1 and represent generally accepted usage of the terms LEO, MEO and GEO. Satellites can orbit at any altitude above the atmosphere, and the gaps in altitude shown in Table 1, such as between LEO and MEO, are also used, if less regularly. It is also common that satellites may orbit in eccentric, non-circular orbits, thereby passing through a range of altitudes in a given orbit.

TABLE I

Typical characteristics of common orbits.

| Orbit | Altitude, km | Velocity, km/s | Exemplary Uses | Comments |
|---|---|---|---|---|
| LEO | 400-2,000 | 6.9-7.8 | Earth observation, sensing, ISS, telecom constellations | Random orbits, 3-10 Y lifetime, space junk issue, little radiation |
| MEO | 15,000-20,000 | 3.5 | GPS, GLONASS, Earth observation | Highest radiation (Van Allen Belt), equatorial to polar orbits |
| GEO | 42,000 | 3.1 | Sat TV, high BW telecom, weather satellites | Can remain above same spot on Earth, typically equatorial orbits |

For most satellites, their useful lifetime is determined by multiple factors. For example, in the case of GEO satellites, small fluctuations in solar winds and earth's gravity require regular use of fuel to maintain the satellite's position and attitude. Once exhausted of fuel, a satellite is typically rendered useless and decommissioned. However, due to GEO height, such a satellite itself will stay in orbit virtually forever due to its altitude and near zero atmospheric drag. Due to their apparent stationary position as viewed from earth's surface, they are widely used for telecommunications and satellite TV. Their large distance from Earth limits their usefulness in telephone services (time delay) and in high-resolution imaging (distance). They encounter solar winds and cosmic radiation that force use of very specialized and expensive electronics to survive.

MEO satellites are in the mid-range, mostly similar to GEO satellites except that they do not appear stationary when viewed from earth's surface. Their most common usage is for satellite positioning services, such as GPS, and certain Earth observation missions for which their trade-off in altitude between GEO and LEO is beneficial. Due to the presence of the so-called Van Allen Belts, these satellites can suffer large amounts of radiation and therefore require very specialized and expensive electronics to survive.

LEO satellites, conversely, may be in a constant state of very slight atmospheric drag requiring either regular boost to their altitude (e.g. fuel burns) or an end-of-useful-life caused by reentry and burn up similar to a meteor entering the earth's atmosphere. As an example, the International Space Station (ISS), orbiting at about 425 km, loses approximately 2-4 km/month of altitude and requires regular fuel burns to ensure it stays in proper orbit. But the atmospheric drag is still very low and LEO satellites can remain in orbit for years without fuel burns.

This relatively long life is the source of so-called "space junk", in which any orbiting device can potentially collide with a useful satellite, thereby damaging or destroying it and creating additional orbiting objects. It is a widely recognized issue that at some density of space junk, probabilities of collisions increase, eventually leading to a virtually unusable orbit. A beneficial element of the current invention is to provide satellite services without increasing the space junk issue and furthermore to enable a mechanism that will be "self-cleaning" in the chosen orbits of 100-350 km.

Due to various shielding effects, especially of earth's magnetic fields, LEO satellites encounter little radiation and therefore do not necessarily require specialized and expensive electronics to survive. An exception to this rule is the so-called South Atlantic Anomaly, or SAA, which is a region in which a higher density of energetic particles may be found, causing short term interruptions of some electronics. This effect can be mitigated by many known techniques, so does not present a large issue for LEO satellites.

In fact, continual improvement in system operation is realized since by lowering the operating altitude, system components (e.g. optics, electronics, synthetic aperture radar (SAR), required solar panel area, etc.) can be made smaller, which in turn reduces vehicle size and drag, thereby enabling an even lower operating altitude, and so-on. While it is desirable to be closer to earth's surface (or any celestial body's surface, say Mars), atmospheric density effectively sets a lower limit on orbital altitude; or forces expensive, heavy counteracting systems such as on Gravity field and steady-state Ocean Circulation Explorer satellite (GOCE), discussed below. For bodies without an atmosphere, such as earth's moon, there is no lower limit other than hitting the body itself.

SUMMARY

In one example, a satellite network is described that includes a plurality of satellites arranged in an orbit having an altitude between 100 km and 350 km. Each satellite includes a system to ingest ambient air particles, to thermalize, concentrate and slow the incoming ambient air particles. Each satellite includes an ion engine configured to ingest the ambient air particles, ionize the ambient air particles, and generate thrust from the ionized ambient air particles sufficient to maintain the orbit of the satellite.

In another example, a satellite is configured to orbit a terrestrial surface at an altitude between 100 km and 350 km. The satellite includes a system with an inlet to thermalize, concentrate and slow incoming ambient air particles. The satellite also includes an ion engine configured to ingest and ionize the ambient air particles and generate thrust from the ionized ambient air particles sufficient to maintain the orbit of the satellite.

In yet another example, a method is described of generating thrust in a self-sustaining low earth orbit satellite. The method includes ingesting ambient air particles by a system configured to slow the ambient air particles by at least two orders of magnitude and to concentrate the ambient air particles by at least one order of magnitude within said satellite. The method further includes ionizing the ambient air particles by an ion engine, and accelerating the ionized ambient air particles through an ejection port of said satellite to generate thrust.

BRIEF DESCRIPTION OF THE DRAWINGS

The several figures provided here describe examples in accordance with aspects of this disclosure. The figures are representative of examples, and are not exhaustive of the possible embodiments or full extent of the capabilities of the concepts described herein. Where practicable and to enhance clarity, reference numerals are used in the several figures to represent the same features.

DETAILED DESCRIPTION

This detailed embodiment is exemplary and not intended to restrict the invention to the details of the description. A person of ordinary skill will recognize that exemplary numerical values, shapes, altitudes, applications of any parameter or feature are used for the sole purpose of describing the invention and are not intended to be, nor should they be interpreted to be, limiting or restrictive.

The current disclosure relates to vehicles operating at altitudes between about 100 km to 350 km, what is defined as a Near Earth Orbiter (NEO), using self-sustaining ion engines for orbiting where atmospheric density is too high for traditional satellites and too low for airborne vehicles. To be clear, a self-sustaining ion engine (SSIE) is an ion engine system that "scoops" in ambient atmospheric particles (e.g., atoms and molecules), ionizes them, accelerates and then ejects them to create thrust on the vehicle. To remain in stable orbit, the SSIE generates sufficient thrust to overcome the vehicle's drag. The SSIE may be powered by solar energy and require no stored propellant (as is typical for conventional ion engines) or other stored energy source, hence the name "self-sustaining." Ion engines are also known as electric propulsion (EP), or ion thrusters.

Figure 1:
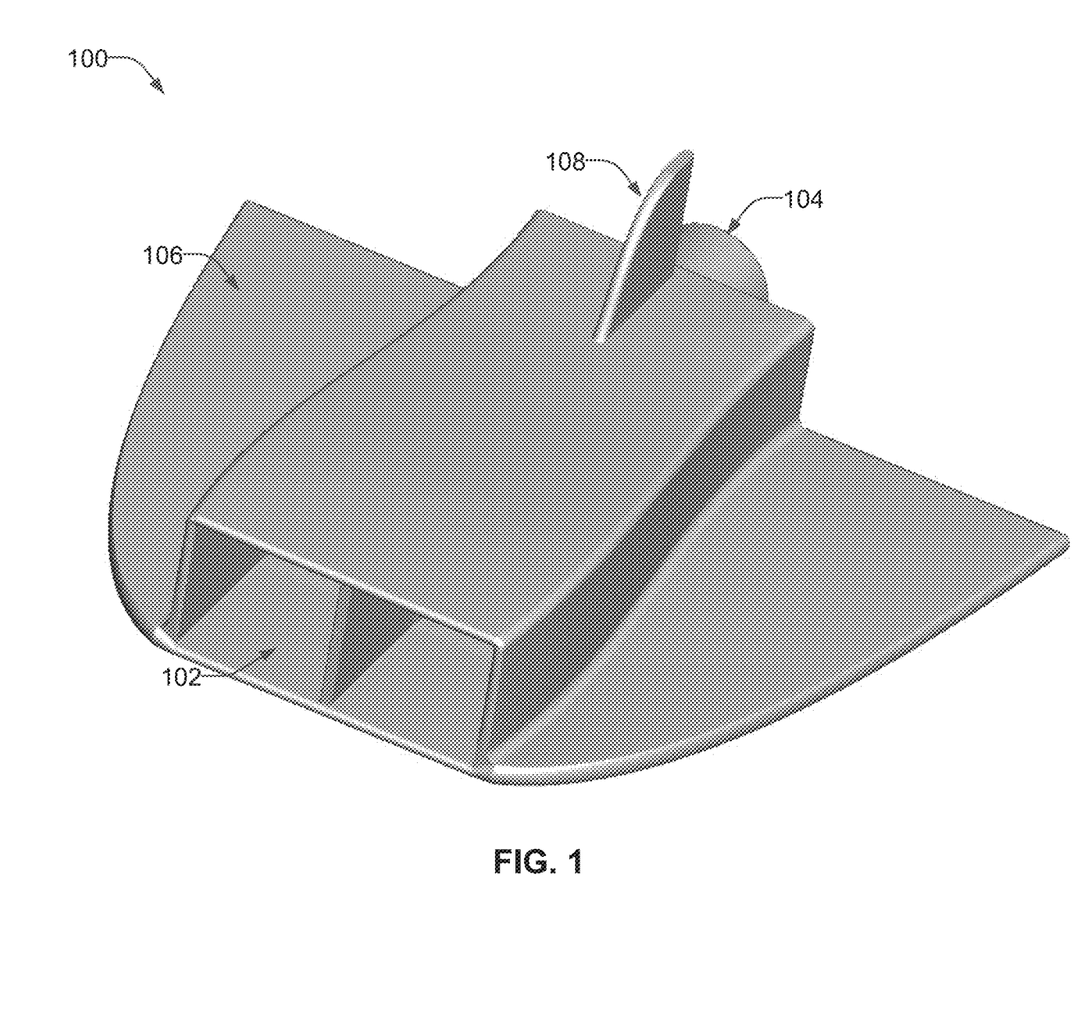
FIG. 1 shows an example satellite in accordance with aspects of this disclosure.
Figure 2:
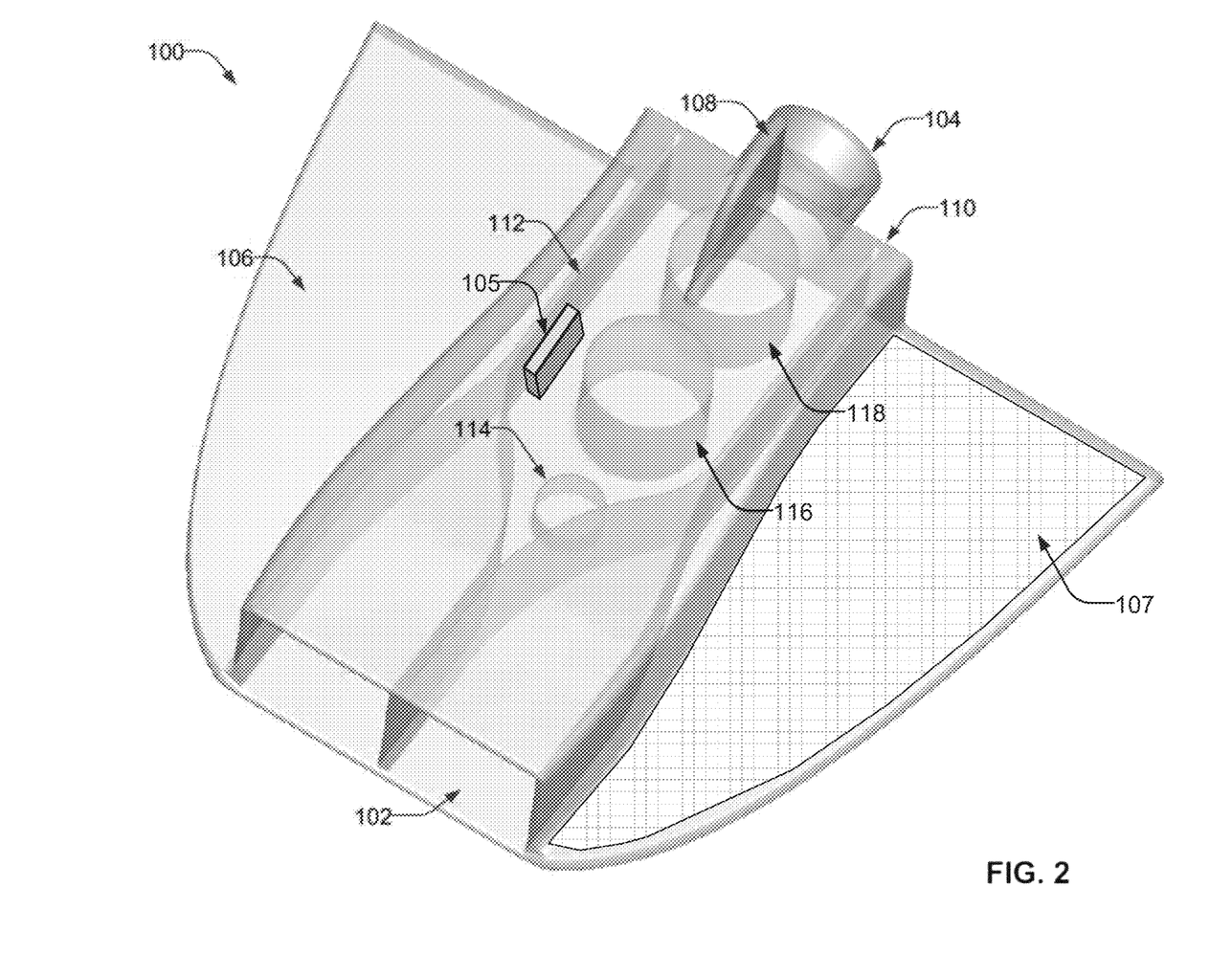
FIG. 2 shows an example satellite in accordance with aspects of this disclosure.

FIG. 1 illustrates an exemplary version of a NEO vehicle 100. The NEO vehicle 100 can include a concentrating and slowing (C&S) System, with an opening 102 to ingest and direct ambient air particles (see also, e.g., FIGS. 6-9). The NEO vehicle 100 can further include an ion engine 104 to ionize and expel the air particles, thereby generating thrust to maintain the desired orbit. One or more stabilization surfaces 106 and 108 can be employed, designed to enhance the stability of the NEO vehicle 100, as well as support solar paneling to collect power. The example of FIG. 2, shown in perspective view with internal details of the NEO vehicle 100 revealed, illustrates the interior of an example C&S system, where the opening 102 is directed to a narrowing channel 112 to direct ambient air particles into the ion engine 104. In the example of FIG. 2, there are two openings 102 and two channels 112 feeding to a central ion engine 104. In FIG. 2, the channels 112 are not directly connected to the ion engine 104, rather the channels 112 lead to exit ports 110 at the back of the NEO vehicle 100. However, a connection between the exit port 110 of the channel 112 is implied, and a person of average skill will realize that a number of connection strategies could be used, depending on the number of ion engines, and the relative geometry of the channels and ion engine(s). In other examples, a single opening 102 and single channel 112 can be used, as well as three or more such openings and channels. Similarly, each channel 112 can feed into a single, dedicated ion engine 104 or additional ion engines (not shown) may be fed by the channels 112. Moreover, in this example, the channel 112 is oriented orthogonally from the bottom surface of the NEO vehicle 100 (i.e., in the plane of surface 106). In other examples, the channel 112 can be oriented parallel to the bottom surface of the NEO vehicle 100, or any angle there between. In some examples, the channel 112 can have a varying cross-sectional area (e.g., cylindrical, conical, etc.), or some alternative geometry, that effectively collects, slows and directs the ambient air particles into the ion engine 104.

Figure 3:
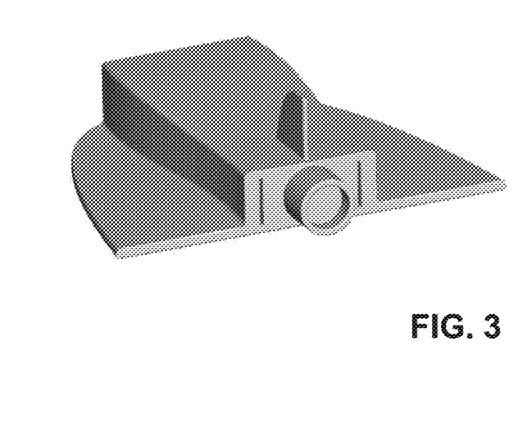
FIGS. 3 through 5 show perspective views of example satellites in accordance with aspects of this disclosure.
Figure 4:
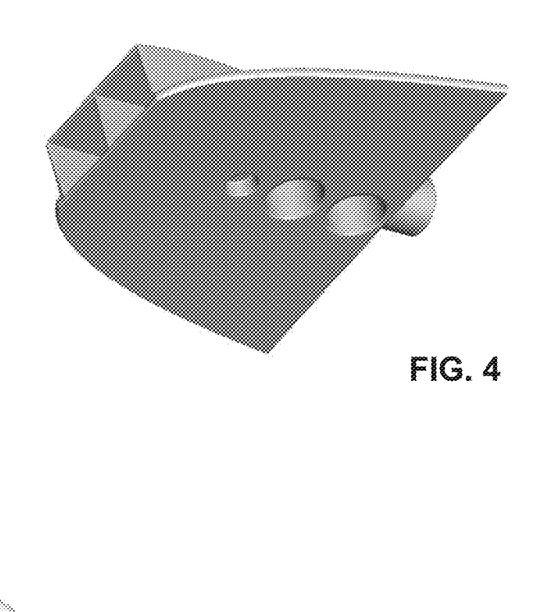
Figure 5:
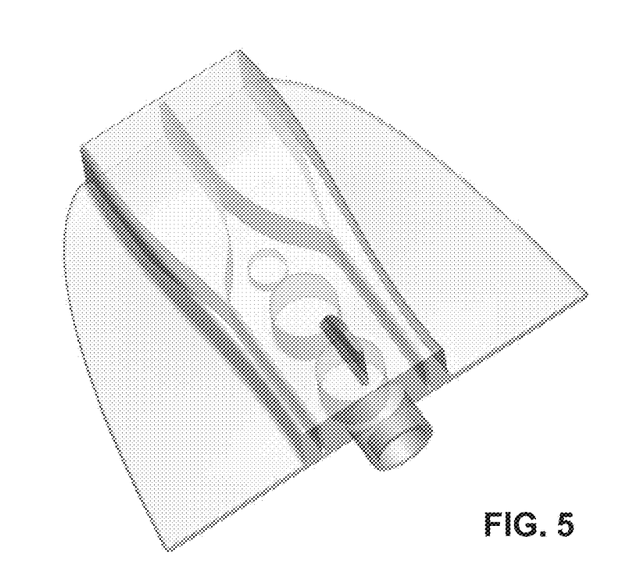

The NEO vehicle 100 of FIG. 2 further illustrates one or more radar or radio components 114 and one or more optical imagers 116, 118 (e.g., variable field of view, multispectral imaging, etc.). Additional and alternative components may be included in the NEO vehicle 100, such as radio frequency (RF) antennae, sensors, electronics bays for electronics and control circuitry 105, cooling, navigation, attitude control, and other componentry, depending on the conditions of the orbiting environment (e.g., air particle density), the particular application of the satellite (e.g., optical imaging, telecommunications transceiver, scientific research etc.), for instance. The NEO vehicle 100 can further include energy storage capacity, such that solar paneling 107 can recharge a battery to, for example, power the components (e.g., 114-118) and ion engine 104 of the NEO vehicle 100. FIGS. 3-5 illustrate additional perspective views of the NEO vehicle 100.

As described below, a properly designed NEO vehicle enables an SSIE with sufficient thrust to ensure stable orbital operation by ingesting neutral air particles; concentrating and slowing them; then ionizing and accelerating them, thus creating sufficient thrust to overcome the vehicle's drag. This enables Near Earth Orbiters, NEOs, a term we use to describe the system and its constituent vehicles (i.e., a "NEO satellite system", "NEO vehicle" or a "NEO satellite") operating in stable orbits at 100-350 km without carrying a store of primary propellant. Therefore, it is a purpose of this invention to describe a satellite system based on orbital vehicles operating in stable Earth orbits at altitudes well below traditional satellites, specifically between approximately 100 and 350 km.

In the described examples, atoms and molecules are collected, concentrated, and ionized. Ionization occurs when at least one electron is stripped from an unionized atom or molecule, thereby creating an ion and free electron(s). The ions are then accelerated by the ion engine (104) to produce thrust, and the electrons are ejected from the NEO vehicle 100 to avoid charging effects on the satellite. It is an element of the NEO vehicle 100 that it has an electron ejection mechanism to neutralize such charging.

Some example satellites orbit at altitudes below LEO (i.e., lower than 350 km). Due to atmospheric drag at these altitudes, thrust is provided on a continuous or near-continuous basis or the vehicle's orbit will decay in a matter of days, weeks or months, depending on altitude (see, e.g., FIG. 1). The NEO vehicle 100 described herein is configured to provide sufficient thrust to maintain orbits between 100-350 km and to do so without having to carry propellant (e.g., ejected material that causes thrust) or fuel (e.g. stored energy source carried into orbit such as chemical fuels).

Figure 12:
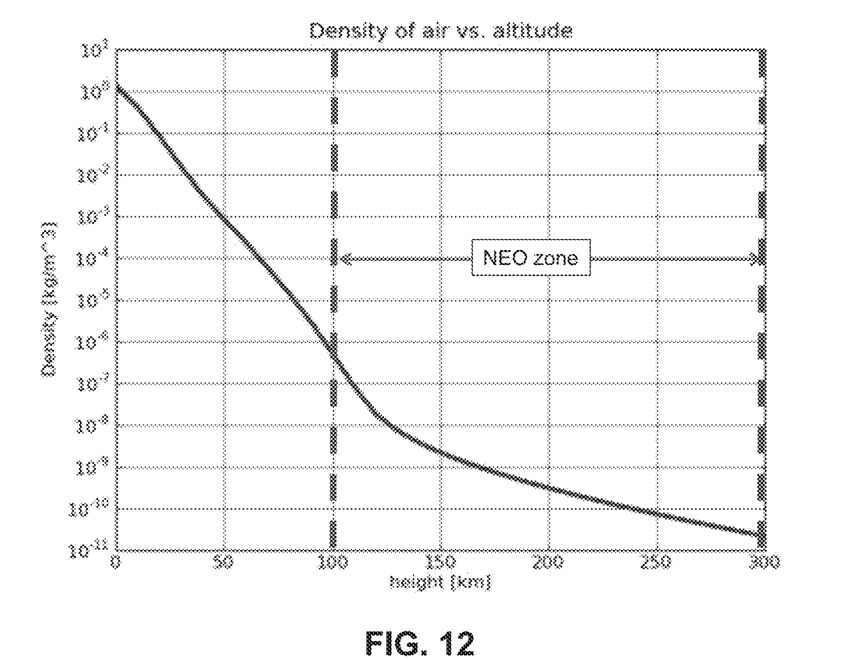
FIG. 12 illustrates graphical data of density of air versus altitude.

At altitudes lower than LEO, atmospheric density increases exponentially, as shown in FIG. 12. Below an altitude of about 120 km, atmospheric density that causes atmospheric drag increases by an order of magnitude about every 20 km. Meanwhile, above that breakpoint and up to about 400 km, the atmosphere changes by an order of magnitude about every 50-75 km. The key effect is that atmospheric density, and therefore drag, is about 5 orders of magnitude higher at an altitude of 100 km compared to the altitude of the ISS at about 425 km. This is one reason maintaining a stable orbit for a traditional satellite without using substantial fuel to create compensating thrust has not been possible. Accordingly, very few satellites operate below about 400 km, and those that do are often in highly elliptical orbits, thus spending very little time at the lower altitudes.

Maintaining a lower altitude orbit is desirable for multiple reasons. For instance, any earth imaging application can get effectively higher resolution images from a smaller, less complex camera simply by being closer to the surface. For example, if an imager is 3 times closer to its object, it will get approximately 9 times better resolution (i.e., in pixels per area) for a given optical system. Similarly, for telecommunications, due to the inverse square law relationship between radio frequency (RF) energy and distance, a transmitter that is 3 times closer will create 9 times stronger signal at a receiver, or require 9 times less power to achieve the same signal power at the receiver. Additionally, for an active radar application, being 3 times closer requires 81 times less power for equivalent performance due to the $1/r^4$ power law of radar. All of these factors enable the exemplary NEO vehicle 100 to reduce the size and cost of a NEO satellite system sufficiently to enable large satellite constellations that have short revisit times at affordable cost.

In the example NEO vehicle 100, due to the immense savings in power, a NEO constellation employing radar applications may create near-real time radar imagery of the earth's surface. Considering a synthetic aperture radar (SAR) as an example, typical satellite-based SAR systems in LEO orbits require average transmit powers in the kilowatt range. Such radars therefore require very large solar arrays to power them and then complex cooling systems to remove the waste heat.

For a NEO SAR system with an 81 times reduction in power, the average transmit power consumption is reduced from, for example, 1 kW to about 12 W. The solar panel size, weight and cooling required would also reduce by 81 times, thereby making such SAR systems that much cheaper to launch and operate. If the relative altitude were to be ¼ instead of ⅓ of the traditional altitude, the savings would increase to 256 times and the SAR example above may require less than 5 watts of transmitted power.

The value and opportunity for this ultra-low power NEO SAR is that such radars can image the earth's surface at night, through clouds, and even through some dust storms. Therefore, a given NEO SAR system would be able to create useful images approximately 100% of the time while reducing the statistical impact of night and cloud cover.

To achieve a SAR, an array of transmit/receive elements is provided with precise spacing, typically at half the wavelength of the transmitted energy. Such elements could be provided on a single NEO satellite with the array attached to or trailing behind the NEO satellite in the direction of motion, thereby creating the typically oblong beam pattern required for SAR. The element array could also be created by a formation of NEO satellites which maintain accurate spacing, with such an arrangement also useful for longer wavelength radars. In both cases, the relative power savings is maintained due to the low altitude of the NEO orbits.

Other Earth observation requirements also benefit from lower altitude orbits. For example, the European Space Agency GOCE satellite configured to provide highly accurate gravitational measurements, was placed in a very low orbit (i.e., about 250 km) that normally would have decayed very quickly. To stay in orbit for the desired 3-year life, the satellite carried an ion thruster to expel its stored Xe atoms, thereby creating sufficient thrust to counteract the atmospheric drag. Launching sufficient Xe into orbit was both expensive and heavy. And, when the satellite ran out of Xe, initiating ion thrust was not possible, a reentry process started that eventually destroyed the satellite.

Ambient Ingesting Ion Engines have also been proposed, also called a gridded ion engine (GIE). Such an engine was never actually demonstrated, largely because the proposed approach has no fewer than two fatal flaws. For instance, a proposed ion engine relied on ingesting and accelerating ambient ions as opposed to neutral atoms. Previous attempts failed to realize that ingesting ions in equilibrium with the rest of the atmospheric particles, and then accelerating them, would create no net thrust. Experiments have shown that such devices generate no net thrust due to this electrostatic equilibrium issues.

Further, the density of ions at these altitudes is about 3-5 orders of magnitude lower than neutral atoms or molecules. But neutral atoms and molecules cause drag so the thrust generated exclusively from naturally occurring ions would inherently be many orders of magnitude less than the drag generated from neutral particles. Hence, the proposed GIE would not have created sufficient thrust and therefore cannot be used for the current, or any, NEO satellite application.

The example NEO satellite system described herein is capable of providing satellite imaging, communication services, radar imaging, earth measurements and other satellite services based on one or more NEO orbiting vehicles operating in long term, stable orbit at altitudes between approximately 100-350 km. Further, the satellite system includes an array of such NEO satellites in sufficient density to enable near-real time coverage of the earth. Benefits of the NEO vehicle 100 with a sustainable orbit would accrue to virtually all other satellite applications, such as communications.

The NEO vehicle 100 of FIG. 1 is capable of operating in a long term, stable, self-sustaining orbit at altitudes between approximately 100-350 km without the need to carry either propellant or a stored energy source into orbit. As described in greater detail below, the NEO vehicle 100 is able to ingest ambient (e.g. neutral) atmospheric atoms and molecules, ionize, accelerate and emit those atoms and molecules, and neutralize any resulting charge built up on the NEO vehicle 100 in the process.

At altitudes of 100-350 km, earth's atmosphere is made up primarily of O, $O_2$, N and $N_2$ in their neutral (i.e., un-ionized) state. In an example where the NEO vehicle 100 orbits the Earth at about 160 km, the NEO vehicle 100 has an orbital velocity of about 7.8 km/sec, these atom and molecule species have a velocity relative to the vehicle of the same 7.8 km/sec. The overall atmospheric density (i.e., all species combined) is approximately 1e-9 kg/m$^3$ (i.e., an atmospheric pressure of about 1e-9 atm). These conditions are not suitable for operating traditional ion engines.

To enable the ion engine 104 for use in a NEO vehicle 100, the relative velocity of the particles should be slowed significantly and the density increased significantly, as is common with the operating pressures of ionization chambers in traditional ion engines. One element of the NEO satellite system is the use of a system for concentrating and slowing the atmospheric atoms and molecules. An exemplary concentrating and slowing system (C&S system) is shown and described in FIGS. 6-9.

Figure 6:
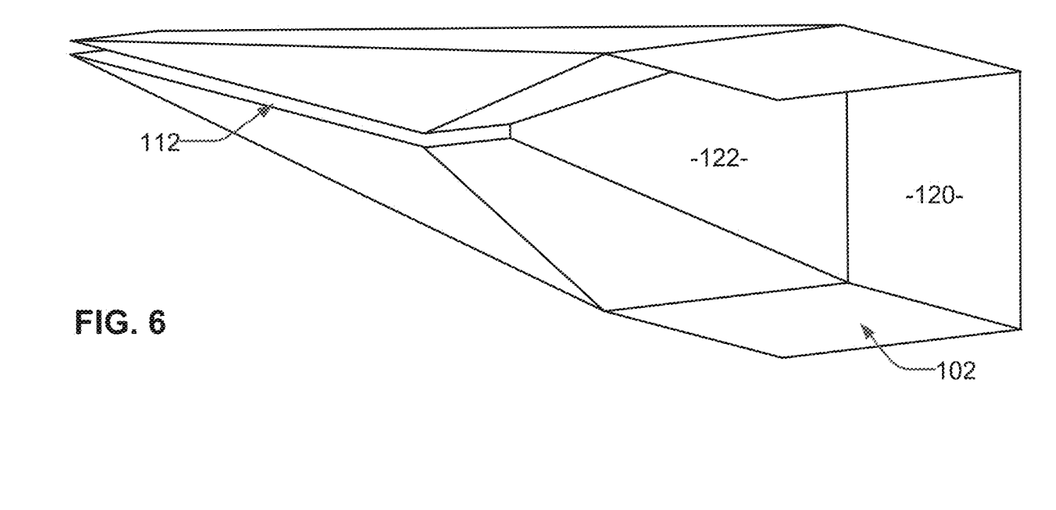
FIG. 6 shows example concentrating and slowing system in accordance with aspects of this disclosure.

FIG. 6 provides a cross-sectional view of the features of the C&S System. As shown in detail in FIG. 8, atmospheric particles enter the chamber opening 120, they encounter an inner wall 120 of the C&S system, which can be made of carbon, metal, ceramics, or other suitable materials. On a microscopic scale, these materials have a surface roughness substantially larger than the size of the air particles. The incoming particles are momentarily trapped by the surface roughness, thereby giving up their kinetic energy to the wall material, thence departing from contact with the surface having significantly less kinetic energy. The particles are prone to reflection from the surface at random angles, resulting in so-called diffuse reflection, shown in detail in FIGS. 8 and 9.

The trapped particles do not attach to the surface 120, but are just detained momentarily and thermalized (i.e., the particles "rattle around" in the rough areas until they come to thermal equilibrium, or are "thermalized", with the surface material). Once thermalized, the particles are emitted from the wall 120 material having a new thermal velocity, which is lower than their original incoming velocity and in random directions due to diffuse reflection. The emitted particles may then hit other walls 122, with some fraction of the particles bouncing back out of the C&S opening 102, but many of them concentrating in the channel 112 of the C&S system. At the opening 102, the air density is at a minimum, whereas within the channel 112, air density is several orders of magnitude higher, as shown graphically in FIG. 13.

In one example, different wall materials are provided at different locations along the C&S system. For example, atomically smooth materials such as sapphire or other polished materials may be used to direct incoming particles (i.e., at surface 122, or any other desirable surface location), where interactions would be similar to specular reflection. The C&S system may then direct particles to a focal point within the C&S system having a rougher surface (e.g., surface 126 of FIG. 8), thereby thermalizing the particles. In such a structure, particles may be focused and then thermalized, increasing the percentage of particles collected. Additionally or alternatively, catalytic materials may be used for the inner walls of the C&S system. Such materials could efficiently recombine O atoms into $O_2$ molecules through surface catalytic reactions, in a process similar to the catalytic converter technology used in automobiles. Converting O into $O_2$ within the C&S system could be beneficial, since it is desirable to ionize and accelerate particles with a large molecular weight for maximum thrust. There are a number of material choices that could accomplish this. The overall geometry and choice of materials of the C&S system may be optimized for various altitude and flight conditions.

Figure 7:
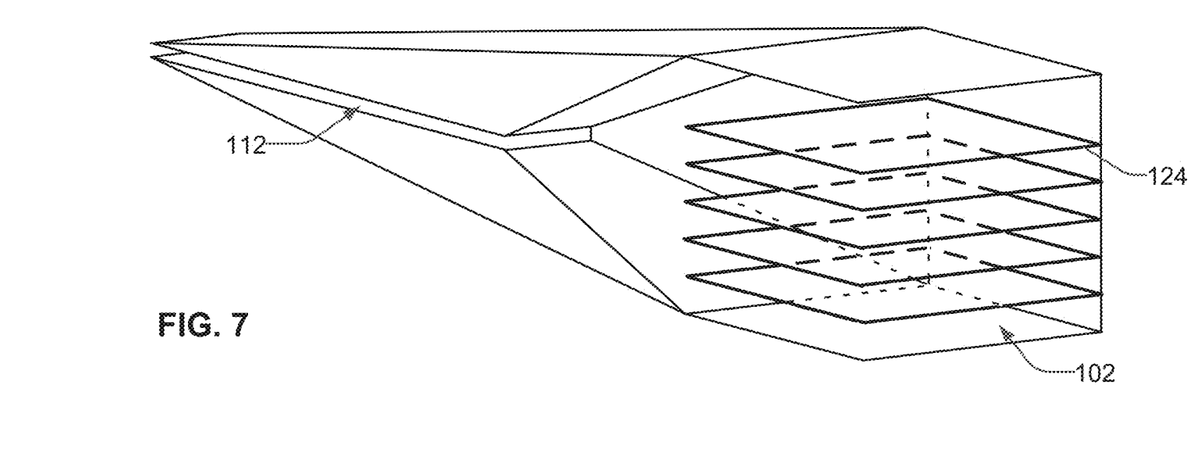
FIG. 7 shows another example concentrating and slowing system in accordance with aspects of this disclosure.
Figures 8, 9:
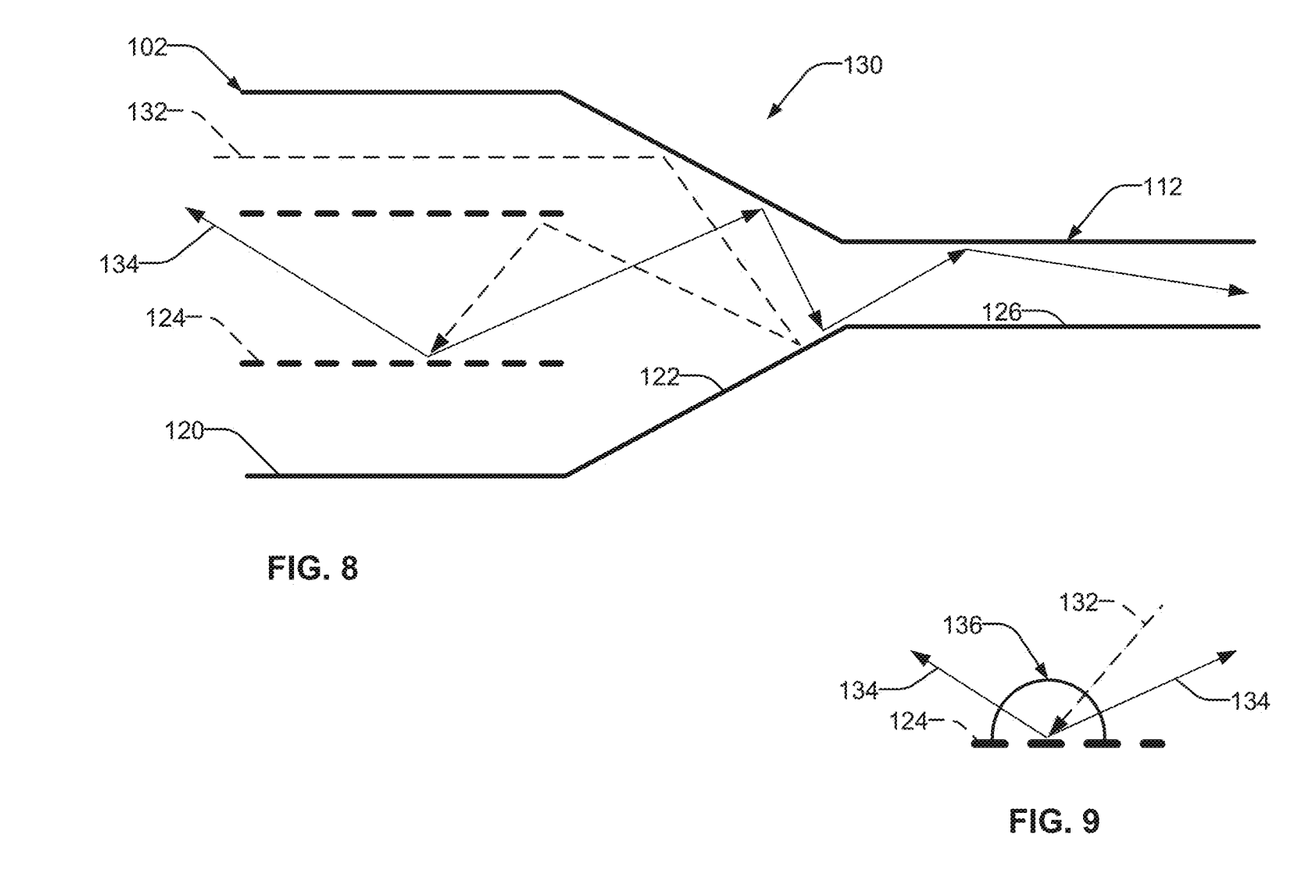
FIG. 8 shows a cross-sectional schematic of an example concentrating and slowing system in accordance with aspects of this disclosure.
FIG. 9 shows a magnified view of an interaction with an example concentrating and slowing system in accordance with aspects of this disclosure.

FIGS. 6-8 show example configurations for the C&S system, including opening 102 (i.e., a wide scoop) that feeds into channel 112 (i.e., a narrow duct). In one example shown in FIG. 7, the opening 102 contains one or more flat fins 124 that may act as a trap to prevent particles from escaping the C&S system. FIG. 8 shows the effects of multiple interactions between atoms and molecules and one or more surfaces of the C&S system. As shown in FIGS. 8 and 9, incoming particles 132 can "bounce around" off of walls 120, 122, 126, which each can be configured with a different material to optimize the trajectory of particles. For example, a fraction of incoming particles 132 may not initially enter the duct, rather they may bounce back in the upstream direction and possibly escape the mouth (i.e. opening 102) of the C&S system. The addition of fins 124 may prevent such particles from escaping and reflect a portion of them back into the duct. As shown in FIGS. 8 and 9, due to their random direction, escaping particles will likely collide with a fin 124, these particles may undergo diffuse reflection, causing the deflected particle 134 to eject at random angles 136 from the surface of the fin 124, as shown in FIG. 9.

Therefore a fraction of the escaping particles may escape, however, a fraction will be reflected back towards the duct, and after further diffuse collisions, such particles may enter the duct as shown in FIG. 8. As shown in FIG. 9, the incoming particles 132 undergo diffuse reflection after contact with the surface of fin 124, meaning that they bounce from the surface at random angles 136 relative to their incoming track, which differs from, for example, specular reflection experienced by light beams reflecting from a mirror.

Under favorable conditions, the trap can achieve an increase in density and pressure in the C&S system compared to the duct and scoop geometries without fins 124. However, if the angle of attack of the vehicle is non-zero, or erosion of the thin fins 124 occurs due to high velocity collisions with massive particles, the fins 124 may serve to block the incoming gas. Selection of material, size, and spacing of the fins 124 can be customized for specific atmospheric conditions at a desired altitude for deployment of the NEO vehicle.

Various elements of the C&S system may be optimized, such as the precise geometry of the opening 120 and channel 112, specular and diffuse reflecting materials and their respective placement, as well as the geometry of the fins 124, depending in accordance with expected atmospheric and orbital conditions. Optimization may include a throttling capability, such as a valve configuration at various points within the C&S system to build up gas during high density portions of the orbit and use this excess gas in lower density portions of the orbit. A useful aspect of the NEO vehicles is that even a simple inlet geometry, designed for purely diffuse reflection, is able to produce gas conditions within the operating range of existing ion engines.

Figure 13:
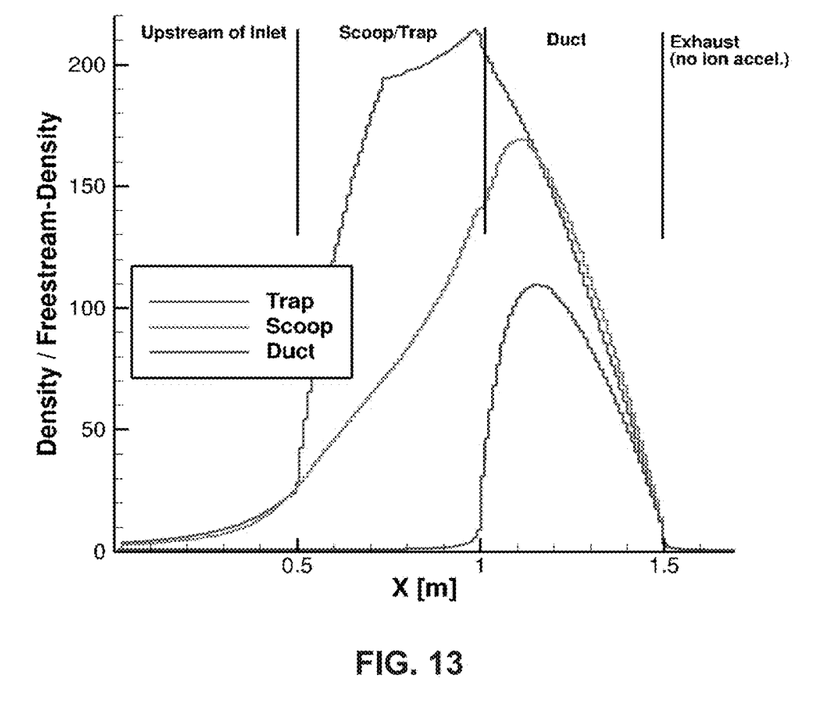
FIG. 13 illustrates graphical data of density of air particles within an example concentrating and slowing system in accordance with aspects of this disclosure.
Figure 14:
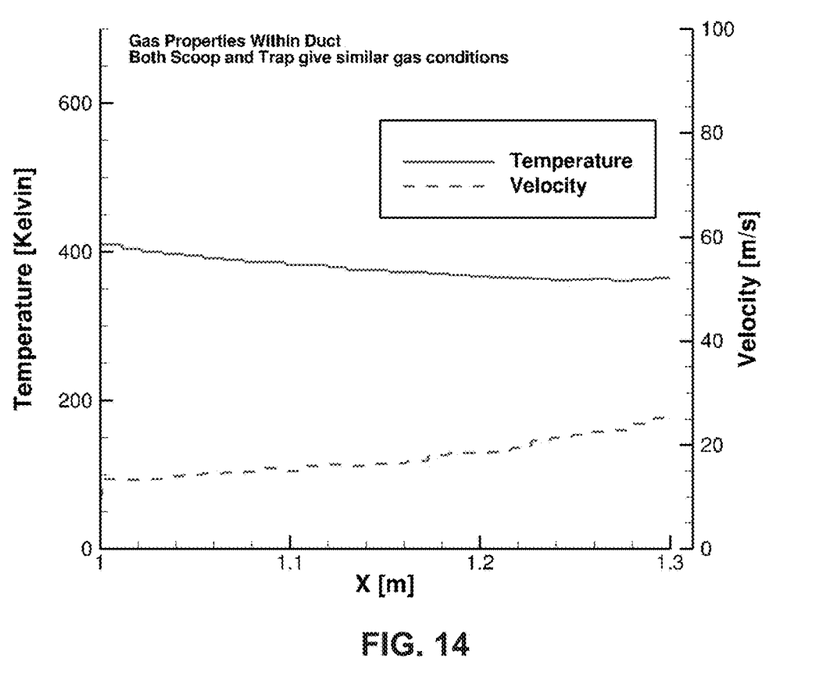
FIG. 14 illustrates graphical data of gas properties within an example concentrating and slowing system in accordance with aspects of this disclosure.

Referring to FIGS. 13 and 14, results are shown from direct simulation Monte Carlo (DSMC) calculations under actual atmospheric conditions at 160 km of an example C&S system. DSMC modeling is useful, not only due to the complex geometry of the C&S system, but because large density increases may result in gas conditions where particle-particle collisions become significant and the flow is no longer free-molecular within portions of the C&S system. For instance, the C&S system can increase atmospheric density and therefore pressure by over 200 times the atmospheric pressure at the entrance of the opening. The pressure at the entrance of the duct 112 has increased to approximately 0.025 Pa (25 mPa), which is a pressure that allows the ion engine 104 to operate. Some example engines have an operating pressure of $2 \times 10^{-4}$ Torr=25 mPa. For example, a microwave discharge ion thruster was developed and tested at an operating pressure of 25 mPa. FIG. 14 shows that gas bulk velocity is about 20 m/s, reduced from the inlet velocity of 7.8 km/s and that the gas temperature is close to 400 K, which is manageable from a heat load perspective. By actively or passively cooling the duct walls, the gas temperature within the duct could be further controlled. Depending on the characteristics of the C&S system, it is expected that the C&S system will be capable of capturing up to about 40% of the incoming particles and, in this example, channel them into the duct region. Given a nominal free-stream density of 1e-9 kg/m³ at 160 km altitude and 7.8 km/s flight velocity with a cross-sectional area of 20 cm×45 cm for the C&S system this produces a captured mass-flow rate close to 0.3 mg/s. The calculated drag on the C&S system (opening or trap) using DSMC for the 160 km example is approximately 5 mN, and for a C&S system and NEO vehicle combination (see FIGS. 1-5) is expected to be between 5-10 mN. Existing ion engines have been demonstrated to produce similar thrust levels given similar gas conditions and flow rates.

The results discussed above show the potential for the C&S system to provide a vehicle with thrust greater than drag. A first order argument can be made that, in this example, 60% of the particles bounce back out of the C&S system, but do so at the relatively low average velocity of less than 300 m/s, compared to the incoming velocity of 7.8 km/s. Therefore, they impart drag nearly equal to the momentum they had when they struck the inner wall of the scoop section of the C&S system. However, the 40% of the particles concentrated and slowed by the C&S system may be fed into an electric propulsion system that may accelerate them to many keV of energy, or 25-400 times greater than the incoming energy of the particles (typically arriving with about 10 eV and exiting with anywhere from 250 eV up to a multiple thousand eV).

The described NEO vehicle 100 and incorporated C&S system provides for the accelerated ions to impart substantially more thrust than the decelerated (i.e., impacted) particles created in drag. In this case, assuming 1 kV of accelerating voltage, or about 100 times the kinetic energy of the impacted (drag producing) particles, only 6% of the incoming particles need to be accelerated to 1 kV to overcome the drag created by the 60% of the incoming particles that induced drag. This is because the 100 times increase in an exiting particle's energy represents a 10 times increase in momentum, or thrust.

The thermalized gas conditions created by the C&S system are suitable for various forms of electronic propulsion devices (i.e., ion engines) such as pulsed plasma thruster (PPT), Hall-effect thruster (HET), microwave discharge, and RF discharge devices. An example microwave discharge thruster was tested for an ionization chamber pressure of 25 mPa (a pressure similar to that obtained by the C&S system) and produced 30 mN of thrust using 1 kW of power. The thruster, however, operated on Xe, an atomic species approximately four times more massive than the oxygen and nitrogen mix found in earth's upper atmosphere. Thrust in an ion thruster is proportional to the square root of the mass of the accelerated ion, so a skilled person will recognize that the C&S system described herein may provide conditions to generate about 15 mN of thrust, still well above the drag created by the C&S system and example vehicle geometry as described above.

An example ion engine was tested using air species ($O_2$, $N_2$, and a mix of $O_2$ and $N_2$). The ionization chamber pressure of the engine is nominally $2 \times 10^{-4}$ Torr=25 mPa. The engine was tested for a range of conditions, however, the engine produced a nominal thrust of 5 mN using 450 W of power using air species. It is noted that this is close to the drag value for the example C&S system and vehicle geometry described with respect to FIG. 1 and also may employ a solar panel area of just over 1 m² to generate the 450 W of power, which is similar to the surface area of the exemplary vehicle geometry (see FIGS. 1-5). This data demonstrates the feasibility of the SSIE with C&S system invention, potentially using existing ion engine technology. Similar concepts for larger vehicles (cross-sectional area >1 m²), different deployment conditions than those proposed herein, and customized ion engine development may allow for other successful implementations.

In other examples, the NEO vehicle 100 may incorporate navigation, cooling, attitude control, radio transmission, optical and radar imaging, power supplies, and digital processing. The resulting self-sustaining satellite can operate in long term, stable orbits at altitudes between approximately 100-350 km, with the capability to capture and transmit images of a given place on Earth on a high frequency basis, be it hourly or even more often.

The endurance of the NEO vehicle 100 may exceed that of traditional ion engine powered satellites carrying their fuel into orbit. For example, Xe or Ar, both noble gases with relatively high atomic masses, can be used as a propellant. Noble gases are selected because they tend not to damage to elements of the engine, and massive atoms efficiently convert energy into momentum. In the case of a NEO vehicle 100 with a C&S system operating with an ion engine, oxidation and sputtering by oxygen and to some degree nitrogen may limit endurance of the system. Such issues may be mitigated significantly, for example, by proper choice of materials and by proper design of the ionization and acceleration chambers. For example, metallic elements, such as heavy, noble metals like gold do not oxidize and are less susceptible to sputtering than other materials. New synthetic materials or high strength ceramics may also be used.

The described NEO vehicle 100 that maintains a stable, self-sustaining orbit between 100-350 km can be part of an array of satellites in an orbital plane, defined as a satellite necklace (e.g., a single orbital plane with multiple NEOs). Ninety NEOs in a single polar necklace will enable one of these satellites to traverse a given line of latitude about once per minute in a northbound direction assuming orbital times of about 90 minutes, and again on the opposite side of the earth in a southbound direction. In an example, twelve such satellite necklaces may be arrayed, each separated by one hour of longitude, may be able to image any spot on earth on average about once per hour.

Figure 10:
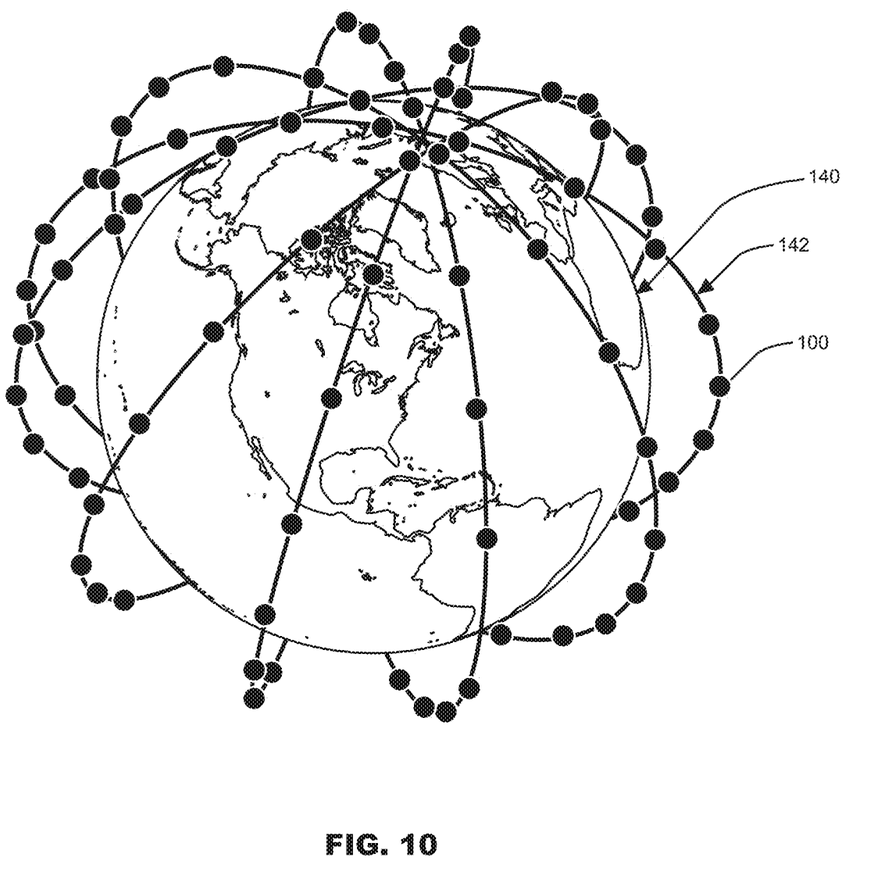
FIG. 10 shows an example of satellite necklaces in accordance with aspects of this disclosure.

In the example of FIG. 10, one or more NEO vehicles 100 can maintain an orbit 142 around the Earth 140, in accordance with the present disclosure. In one example, 90 satellites per necklace can be used, however more or fewer satellites per necklace may be appropriate for a given application. For example, 45 satellites per necklace would space the vehicles at 2 minute intervals, while 180 would space vehicles at 30 second intervals. As a person of ordinary skill will understand, the earth will rotate during the interval between arrival of two sequential NEOs, with that distance determined by the time separation between the satellites. Different spacing distances may impact other subsystem designs such as optical imaging and radio links, but the concept remains that a NEO satellite system can provide relatively high rates of coverage.

Since the time to revisit a same spot on earth is determined by the time for that spot to rotate under the next necklace, doubling the number of satellite necklaces would reduce the revisit time for any spot on earth to 30 minutes or less, depending on the field of view of the onboard imager or radio. Conversely, halving the number of necklaces to 6 would double revisit times. And reducing the number of necklaces to 4 would triple revisit times. These changes would reduce system cost and complexity which may be a reasonable tradeoff for certain applications.

Other orbital planes can be utilized, and non-uniform distributions of NEO vehicles could have beneficial applications. For example, non-polar orbits would increase the amount of time spent over populated areas and reduce the amount of total time spent over the poles. In the initially described system of 12 satellite necklaces with 90 NEO vehicles per necklace, twelve NEO vehicles would fly over each pole every minute. Arrays of necklaces with inclinations to the equator of less than 90 degrees could provide shorter revisit times for areas of greater interest.

Additionally, sequences of satellites with shorter distances between them in a given necklace may be better suited for certain applications. For example, ten satellites separated by a few seconds could provide sequential data on phenomena such as floods, fires or ice melting that could be useful in scientific understanding. A variety of NEO satellite distributions are possible for various applications, each of which can employ the NEO vehicle 100 described herein.

Different altitudes may be beneficial for certain applications. Wider angle coverage from higher altitudes may be an adjunct to higher resolution coverage from lower altitudes. Combination systems in which SAR radar is combined with optical images may be desirable to operate these different sensors (e.g. optical and radar) from different altitudes.

In another exemplary application, it may be beneficial to operate NEO satellites operating at about 200 or 300 km to image orbiting space junk and satellites above them. Thousands of pieces of space junk, from expended launchers to small objects, represent a serious threat to LEO orbiting objects. Tracking such space junk from earth is difficult due to their distance and atmospheric disturbance. Being much closer and moving in independent orbits from those objects can improve tracking substantially.

For SAR radar applications, a smaller number of satellites per necklace and a smaller number of necklaces may be sufficient to provide a desired frequency of useful images thanks to the all-weather and night imaging capabilities of SAR radars. SAR radars employ multiple transmission and reception antenna arrayed in a specific pattern. The pattern is typically longer in one dimension (e.g. the direction of motion) than in the transverse direction. Therefore, a relatively rectangular array of elements may trail behind or be attached to a NEO vehicle to provide the oblong radiation beam needed to construct SAR images. By trailing or attaching such an array of antenna elements, drag will be impacted only marginally since it will be in the particle flow shadow of each NEO vehicle 100.

It is also possible to assemble arrays of NEOs positioned relative to each other in a formation that may create the antenna array and beam pattern needed for SAR. This may be an optimal approach for longer wavelength SAR applications since spacing between elements is typically related to the wavelength of the RF frequency being used.

The benefits and challenges associated with different orbits can be addressed in response to a desired application's requirements. Combinations of SAR images with optical images provide uniquely useful information. For example, radar may be able to image ground contours through dense foliage that can be complemented by optical images of the foliage. Different frequencies for both radar and optical imaging can also add useful information. It is a benefit of the NEO system that near simultaneous imaging on a high revisit rate (e.g., hourly) provides substantial improvements over traditional satellites at higher altitudes.

In addition, a SAR-equipped satellite could be assigned to shadow an optical imager, thereby providing tight correlation between radar and optical images. Such a combination may provide a more comprehensive understanding of activities on earth's surface than either type of satellite alone can offer. For example, a post-earthquake optical image can identify building damage that might be seen by terrestrial observers while radar images could highlight where vertical displacement has occurred in the building, or is occurring as a precursor to an aftershock. Such combinations today rely on long time lags between the two types of imagers, especially due to the scarcity of SAR-capable satellites.

Orbital planes other than polar are obviously possible as well as a hybrid mix of polar and non-polar planes. The specific orbital plane may be modified for different applications. Land mapping satellites may be concentrated in lower latitudes since that is where the majority of earth's land masses are found. The NEO vehicle 100 described herein can be applied to any orbit in the targeted altitude, from polar to equatorial.

Short revisit times can be described above as "near-real time." Traditional LEO and MEO satellites have revisit times of days to weeks, depending on the number of satellites in the constellation. Due to extremely high satellite costs plus high launch costs, satellite constellations are typically limited to a few to a few dozen satellites. Some proposed systems include up to about 100 satellites, promising revisit times down to a day or so.

Near real-time revisit rates offer many advantages and solve many problems inherent in current satellite systems. One example is the "worst case" revisit time as compared to the average revisit time. Most satellites spend about half their orbit in earth's shadow (i.e., night) resulting in poor or useless images. Adding in cloud cover, up to 70% of earth's surface, sand storms and perspective issues (e.g., images taken around noon cast no shadow and are therefore more difficult to interpret) reduce the number of useful images to about one fifth or less of all images taken.

This sampling problem makes it difficult to plan image capture of a certain spot at a certain time. For many implementations, the average time to a useable image may not be as important as the worst case time, which we define as the time between images that meet a certain set of characteristics (e.g., a specific location plus morning or evening, plus no cloud cover, etc.). In this example, getting images of a specific area (e.g., a battlefield or a river flood plain) with a long revisit time constellation can make a worst case scenario push from days into weeks. In this example, a system with a 3-day average revisit time could be overhead at night for several sequential passes, and then encounter cloud cover or dust storms when it is finally overhead with correct lighting. So an average revisit time of 3 days can become a one or two-week worst case scenario, a delay that reduces or even eliminates the value of the images.

Conversely, with an exemplary revisit time of an hour, the current NEO system will generally have a vehicle overhead any spot on earth during daylight hours, many times every day. Furthermore, as clouds and dust storms are not stationary, the probability of having a NEO vehicle 100 overhead during a break in the weather is further increased. Since these statistics are not a purely linear extrapolation of the average revisit times (i.e., they are exponential), worst-case revisit times become much more manageable with the described low revisit time NEO system.

Images are only useful once they are conveyed back to systems on Earth. The NEO vehicle 100 includes a widespread array of receiving stations rather than the normally low number of centralized receiving stations found in use with traditional satellite systems. For example, with 3 receiving stations (e.g., US, Australia and Europe), a traditional LEO satellite will be within transmission range approximately every 30 minutes (90/3), at best. If the imagery data is available with an inherent delay of a week due to the long revisit time described above, a further 30 minute delay is relatively small.

However, for the current NEO satellite system, with average revisit rates of an hour or less, such a delay would be a large percentage of the goal. Therefore, data can be downloaded from the NEO vehicles to a large network of low-cost earth receiving stations to enable low-latency data downloads, ideally with latency from time of taking to time of receiving on the order of minutes to tens of minutes.

In one exemplary solution, receiving stations may be mounted atop commercial cellular base stations, of which there are about 300,000 in the US alone. Most such base stations are designed to support cellular communications radially outward. Therefore, an upwardly pointed radiation pattern can use the open area at the top of the base station tower, directing and receiving all energy to/from an orbiting NEO satellite and away from any interference with the cellular signals.

In order to download sufficient data during an overpass of a single NEO satellite and to meet the size, mass and cost targets of the NEO satellite, a simple antenna with a relatively wide beam will enable a relatively large footprint on earth's surface. For example, a beam with full width half max (FWHM) beam angle of 45° from 100 km altitude would have a circular footprint about 200 km in diameter. Assuming the vehicle's orbital velocity is about 7.8 km/s, a useable receive time of about 26 seconds would result. A narrower beam would reduce this time while a wider beam would increase it.

A tradeoff in the beam width is that as the beam width is reduced, the maximum data rate would typically increase. Hence a tradeoff is made to optimize how much data can be downloaded during a single pass over a given receiver. A further improvement can be made by using a more highly focused beam on the receiving site and having it track the NEO satellite as it passes overhead. This would enable a relatively long dwell time due to the relatively broad NEO satellite transmission beam, along with relatively high data rates due to the relatively tight receiver beam. Also, since mass of the receiver is not as critical as mass on the NEO satellite, placing a more complex (i.e., heavier) receiver and tracking antenna on the receiving side will reduce overall system cost.

In order to ensure low-latency downloads, downloads may occur when a vehicle is passing over long stretches of ocean or other "dead zones", of which the oceans are the largest. In addition to ensuring availability of sufficient receiving stations on islands, receivers may also be placed on ships or buoys to receive the images which can then be transmitted to processing centers via traditional high capacity satellites or fiber links.

In addition, NEO vehicles may include a vehicle-to-vehicle communication system, such as with point-to-point laser systems. Since NEO vehicles are designed to be as thin as possible to minimize drag, laser communications will be effective. In the example of 90 satellites in an orbital plane at 1 minute intervals, distance between satellites will be approximately 450 km. Since the horizon from 160 km altitude is more than 1,000 km away, a laser communications system is capable of providing a direct link to multiple satellites in the same orbital plane. Since the vehicles will be oriented along the orbital plane in order to minimize drag, the control system for the inter-vehicle laser communications may be simple, for example, including possibly a fixed orientation.

Using such an inter-vehicle link would enable very high-speed data rate transfer between vehicles, enabling downloads to be handled by a vehicle other than the one collecting an image. Adding this flexibility to the system has several benefits, including filling dead-zone gaps, backup capability if receivers are unavailable, and backup capability if a downlink transmitter on a NEO vehicle becomes disabled.

Figure 15:
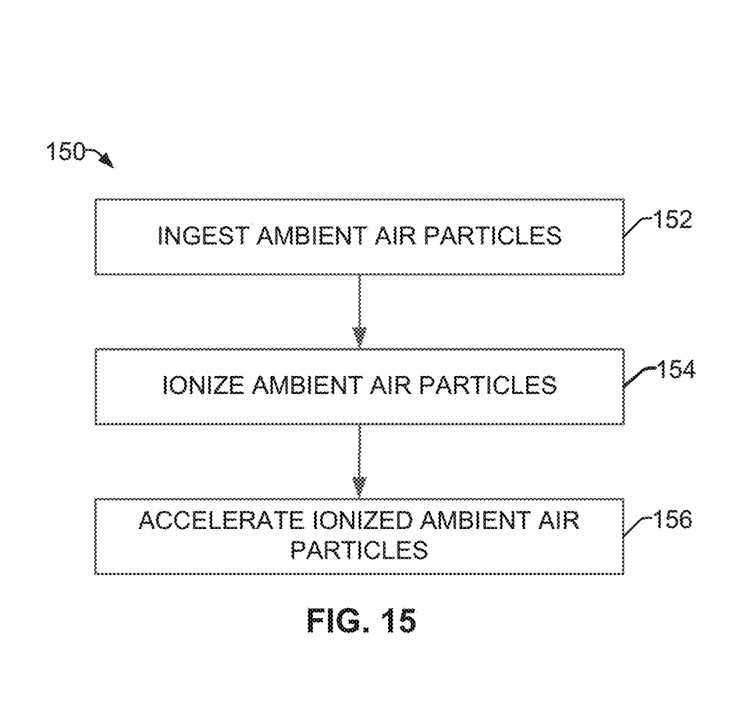
FIG. 15 is a flow chart of a method of generating thrust in a self-sustaining low earth orbit satellite, in accordance with aspects of this disclosure.

FIG. 15 provides a flow chart of an example method 150 of generating thrust in a self-sustaining low earth orbit satellite, such as the NEO vehicle 100, in accordance with aspects of this disclosure. In step 152, ambient air particles are ingested, such as by the C&S system, to slow the ambient air particles by at least two orders of magnitude and to concentrate the ambient air particles by at least one order of magnitude within said NEO vehicle 100. In step 154, the ambient air particles are ionized by an ion engine (e.g., ion engine 104). In step 156, the ionized ambient air particles are accelerated within the ion engine 104 of the NEO vehicle 100 and ejected to generate thrust.

In summary, a satellite system has been described that comprises the following features:

Satellite operation in stable orbits at altitudes from 100-350 km;
Vehicle arrays sufficiently dense to enable overflights on approximately hourly basis;
Concentrating & slowing system that concentrates and slows incoming atoms and molecules to sufficient pressure and speed enabling ion engine operation;
Solar powered, self-sustaining, air ingesting ion engines on each vehicle providing thrust to counteract drag;
Thin, aerodynamic vehicles and payload shapes (i.e., thickness less than width) that minimize drag at orbital velocities and these altitudes;
High density array of receiving stations enabling low-latency data downloads;
Laser-based vehicle-to-vehicle communications system;
Platform for optical and radar imagers; and
Self-cleaning orbital system for any generated space junk, to name but a few advantages of the present disclosure.

A satellite system is described operating at altitudes between 100 and 350 km relying on NEO vehicles that include a C&S System, feeding on atmospheric species into a SSIE to maintain near-constant orbit dynamics. The system operates at these altitudes that are substantially lower than traditional satellites, thereby reducing the size, weight and cost of the vehicles and their constituent subsystems, such as optical imagers and radio links. This reduction in size enables a virtuous cycle of further reduction in vehicle drag, which enables lower altitude flight and further reduction in the size of vehicle components, etc.

The system includes a large number of the low-cost, low-mass, low altitude NEO vehicles, thereby enabling revisit times substantially faster than any previous satellite system. The NEO vehicles spend virtually all of their orbit at the low altitude, high atmospheric density conditions that have heretofore been virtually impossible to consider. The C&S System conditions incoming atmospheric species to be suitable for use in ion engines, thereby enabling sufficient thrust to overcome drag. Short revisit times at low altitudes enable near-real time imaging at high resolution and low cost. The system further includes a distributed earth receiver system relying on a large number of receivers each downloading data during a satellite overpass. The communication link may utilize optimized beam shapes to maximize data download during each pass. A vehicle-to-vehicle laser communication system may be included to improve data download rates, flexibility and reliability. By operating at such altitudes, the orbital mechanics have no impact on the space junk issues of traditional LEO orbits and the system is self-cleaning in that any space junk or disabled craft will quickly de-orbit.

What is claimed is:

1. A satellite network comprising a plurality of satellites arranged in an orbit having an altitude between 100 km and 350 km, wherein each satellite of the plurality of satellites comprises
   an inlet configured to:
      ingest ambient air particles as the satellite moves in orbit, the inlet having a first surface with a first material selected to at least partially specularly reflect the ambient air particles, and a second surface with a second material selected to slow the ambient air particles; and
      concentrate the ambient air particles via a thermalizing, concentrating and slowing process as the ambient air particles interact with the first and second surfaces.

2. The satellite network as defined in claim 1, wherein each satellite of the constellation of satellites is configured to at least one of:
   neutralize ionized transformed air particles downstream of the vehicle; and
   eject excess electrons.

3. The satellite network as defined in claim 1, wherein the inlet is configured to decrease an average velocity of ambient air particles by at least two orders of magnitude and increase the pressure of the ambient air particles by at least one order of magnitude.

4. The satellite network as defined in claim 1, each satellite further comprising a controller configured to:
   determine spatial information indicative of at least one of a current altitude of the satellite, an orientation of the satellite relative to a terrestrial surface, and a position of the satellite relative to at least one other satellite;
   compare a current altitude of the satellite against a desired altitude; and
   control an ion engine to generate thrust from the ionized transformed air particles sufficient to achieve the desired altitude.

5. The satellite network as defined in claim 1, each satellite further comprising a solar energy collection system to provide power to the ion engine and one or more components of the satellite.

6. The satellite network as defined in claim 1, each satellite further comprising one or more sensors to determine the current altitude of the satellite.

7. The satellite network as defined in claim 1, wherein the plurality of satellites occupy more than six orbital planes.

8. The satellite network as defined in claim 1, each satellite further comprising a laser-based communication system configured to transmit information to and receive information from another laser-based communication system of another satellite.

9. The satellite network as defined in claim 1, wherein the first material is selected to be smooth relative to the size of the ambient air particles such that focusing of the ambient air particles is achieved.

10. The satellite network as defined in claim 9, wherein the first or second material is sapphire.

11. The satellite network as defined in claim 1, wherein the second material is selected to transfer kinetic energy from the ambient air particles into the inlet.

12. The satellite network as defined in claim 11, wherein the first or second material is selected based on particle scattering properties and is placed such that tailored focusing and thermalization of the ambient air particles is achieved.

13. The satellite network as defined in claim 11, wherein the second material is selected based on catalytic properties for converting O into $O_2$ and placed such that tailoring the amount of O and $O_2$ entering the ion engine is achieved.

14. The satellite network as defined in claim 1, each satellite further comprising a radio transmitter and receiver to communicate with at least one of an airborne, a shipborne and a terrestrial based radio communication system.

15. The satellite network as defined in claim 14, wherein each radio transmitter and receiver comprises steerable antenna or a fixed antenna pattern.

16. The satellite network as defined in claim 1, wherein the plurality of satellites occupy a first orbital plane, the satellite network further comprising a second plurality of satellites that occupy a second orbital plane different from the first orbital plane.

17. The satellite network as defined in claim 16, wherein the first and second orbital planes comprise at least 45 satellites in each plane.

18. A method of generating thrust in a self-sustaining low earth orbit satellite, the method comprising:
   ingesting ambient air particles by an inlet comprising a first surface with a first material, and a second surface with a second material;
   slowing the ambient air particles by at least two orders of magnitude and concentrating the ambient air particles by at least one order of magnitude within said inlet by interaction with the first and second materials;
   ionizing the slowed and concentrated air particles by an ion engine; and
   accelerating the ionized slowed and concentrated air particles through an ejection port of said satellite to generate thrust.

19. A satellite configured to orbit a terrestrial surface, the satellite comprising an inlet configured to ingest incoming ambient air particles as the satellite moves in orbit, wherein the inlet comprises:
   a first surface with a first material selected to at least partially specularly reflect or diffusely reflect the ambient air particles; and
   a second surface with a second material selected to slow the ambient air particles, wherein the ambient air particles are transformed via a concentrating and slowing process through the inlet.

20. The satellite as defined in claim 19, further comprising one or more stabilizing fins maintained in an orientation perpendicular to the direction of motion of the satellite.

\* \* \* \* \*